United States Patent [19]

Schleifstein

[11] Patent Number: 5,633,085
[45] Date of Patent: May 27, 1997

[54] DURABLE COMPOSITE PARTICLE AND METHOD OF MAKING SAME

[75] Inventor: Robert A. Schleifstein, Edison, N.J.

[73] Assignee: Potters Industries Inc., Carlstadt, N.J.

[21] Appl. No.: 257,909

[22] Filed: Jun. 10, 1994

[51] Int. Cl.$^6$ .................................................. B32B 5/16
[52] U.S. Cl. .................................. 428/403; 428/407
[58] Field of Search ........................... 428/406, 407, 428/333, 403; 525/902; 252/186.25

[56] References Cited

U.S. PATENT DOCUMENTS

| | | | |
|---|---|---|---|
| 4,097,405 | 6/1978 | Watts | 252/316 |
| 4,574,109 | 3/1986 | Laroche | 428/325 |
| 4,888,240 | 12/1989 | Graham et al. | 428/403 |
| 4,937,166 | 6/1990 | Creatura et al. | 430/108 |
| 5,332,767 | 7/1994 | Reisser et al. | 523/209 |
| 5,370,818 | 12/1994 | Schleifstein | 252/186.25 |
| 5,374,357 | 12/1994 | Comstock et al. | 210/666 |

FOREIGN PATENT DOCUMENTS

WO94/21353  9/1994  WIPO.

*Primary Examiner*—Hoa T. Le
*Attorney, Agent, or Firm*—Curtis, Morris & Safford

[57] ABSTRACT

As an article of manufacture, a durable composite, which comprises in combination a glass bead, and a multifunctional polymeric substance which has a functionality capable of interacting with a species of interest, and a further functionality interacted with a functionality of said glass bead to adhere the substance to the glass, such that there is a decreased tendency of the agent toward removal from the composite by an aqueous medium; and a method of making same.

11 Claims, 1 Drawing Sheet

5,633,085

1

DURABLE COMPOSITE PARTICLE AND METHOD OF MAKING SAME

FIELD OF THE INVENTION

This invention generally relates to a durable composite formed by the adherent deposition, on an inorganic material substrate, of a substance which is capable of interacting with one or more species which may be encountered by the composite. In certain of its more specific aspects, the present invention is well suited for durably applying coatings containing sulfonated, sulfated or carboxylated functional groups onto small particles (e.g., glass beads) to obtain composite particles. Practice of the invention enhances the maintenance of the deposited substance on the inorganic material substrate.

BACKGROUND OF THE INVENTION

Substances such as polymeric agents are commonly bonded to inorganic material substrates, for instance, glass beads, to facilitate the chemical or physical interaction of the substance with one or more extraneous species to which the substance is subsequently exposed. Presentation of the substance on the substrate increases the amount exposed for interaction, and confers mechanical strength and other properties desirable for typical reaction conditions.

However, a number of substances, prominently including polymeric agents such as various carboxylated materials, cannot conveniently be bonded to an inorganic material substrate via a direct, chemical link which is hydrophobic. Thus, when deposited on the substrate, these substances are not sufficiently resistant to the solubilizing action of an aqueous medium that the substance remains on the substrate when in contact with the aqueous medium. Although hydrophobic bonding to the inorganic material substrate is possible in theory, it is impractical and extraordinarily expensive because such a process generally involves placing a monomeric material on the substrate, polymerizing the monomeric material and then subjecting same to a harsh sulfonation.

In a recent development, a polymeric agent of the type discussed above is held on an inorganic material substrate via a binding substance which forms a film or coating on the substrate. The binding substance may overlie or be intermixed with the polymeric agent on the substrate, so that when the binding substance is hardened it traps the polymeric agent, securing it on the substrate. Alternatively, the binding substance may be deposited on the substrate, with the polymeric agent overlying such substance, such that the binding substance anchors the polymeric agent by chemical bonding therebetween or by some other holding mechanism. The binding substance may itself bond to the inorganic material substrate and/or polymeric agent, may adhere to the substrate by means of internal bonding which causes the deposit's constituent molecules to interlock on the substrate (thereby holding such molecules in the proximity of the substrate and providing a self-sustaining coating that restrains the polymeric agent from departing the substrate), or may accomplish that end by some other mechanism or some combination of two or more of the foregoing. However, regardless of the mechanism by which the binding substance holds the polymeric agent on the inorganic material substrate, this development—while better than the technology discussed in the preceding paragraph—still could be improved to provide even longer-term durability of the polymeric agent on the substrate.

It would be a substantial advance to provide a composite demonstrating ultra long-term durability against the action of an aqueous medium, which composite contains a functionality capable of interacting with a species of interest extraneous to the composite, normally found in substances which are at least partly soluble in an aqueous medium.

OBJECTS OF THE INVENTION

It is thus an object of the invention to provide an article of manufacture comprising an inorganic material substrate such as a glass bead having bound thereto, in a manner which confers improved resistance to removal by an aqueous medium, a substance which is capable of interacting with a species of interest that may be encountered by the composite.

It is another object of the invention to provide, as an article of manufacture, a free-flowing multiplicity of composite particles, each of which comprises an inorganic material substrate such as a glass bead having bound thereto, in a manner which confers improved resistance to removal by an aqueous medium, a substance which is capable of interaction with a species of interest that may be encountered by the composite particles.

A further object of the invention is to provide a method for forming such article of manufacture.

SUMMARY OF THE INVENTION

In one aspect, the invention is an article of manufacture constituting a composite which comprises in combination a glass bead, and a multifunctional polymeric substance which has a functionality capable of interacting with a species of interest, and a further functionality interacted with a functionality of said glass bead to adhere the substance to the glass, such that there is a decreased tendency of the substance toward removal from the composite by an aqueous medium.

In yet another aspect, the invention is a multiplicity of composite particles, each of the particles comprising in combination a glass bead, and a multifunctional polymeric substance which has a functionality capable of interacting with a species of interest, and a further functionality interacted with a functionality of said glass bead to adhere the substance to the glass, such that there is a decreased tendency of the substance toward removal from the composite by an aqueous medium.

In still another aspect, the invention is directed to a method of forming a composite, and a composite made by such method, which method comprises the steps of combining a glass bead (a) with a multifunctional polymeric substance which has a functionality capable of interacting with a species of interest, and a further moiety capable of interacting with a functionality of said glass bead to adhere the substance to the glass or (b) with one or more materials for forming said substance; and curing the substance or said one or more materials for forming same such that there is a decreased tendency of said substance toward removal from the composite by an aqueous medium.

The invention confers substantial benefits on its practitioner. A principal advantage is the improvement in resistance to removal, by an aqueous medium, of the substance deposited on the glass bead. As a result, the composite of the invention is rendered particularly useful in applications requiring contact with, and especially immersion in, an aqueous medium. A further advantage is that the functionality for adhering the deposited substance to the glass bead, and the functionality which is capable of interacting with a species of interest, are incorporated in a single substance.

(The condition of including each such type of functionality is referred to herein by the term "multifunctional"; the condition of such multifunctionality's being exhibited by a single substance—which, for instance, constitutes a single type of molecule, or a recurring unit of a polymer or copolymer—is sometimes referred to herein by the term "monomolecular".) This eliminates nonuniformities and discontinuities in the coating on the glass bead which result, in certain alternative techniques, from uneven mixing or uneven deposition on an inorganic material substrate of the polymeric agent that functions as the active ingredient and the binding substance which holds that agent in place. Also, use of a multifunctional substance eliminates complications which could otherwise result from the need to utilize a plurality of components or very severe reaction conditions. Moreover, it is a significant advantage of the invention that a multiplicity of composite particles in accordance with the invention is substantially free-flowing, rather than tending to clump or otherwise agglomerate due to retained moisture, tackiness, or the like.

As will be recognized by those skilled in the art, the durable composite of the present invention has many uses, such as a flocculant in waste water, an ion-exchange agent, or a component useful in manufacture of fluid-purification media. By way of illustration, polymeric substances having carboxylated side chains or sulfonated groups are frequently utilized as ion-exchange agents; in accordance with the invention, these substances (appropriately modified if necessary to incorporate a glass-adherent functionality) are typically deposited on glass beads to make a durable composite.

Various other objects, features and advantages of the invention will be readily apparent from the following description of the invention, when read with reference to the accompanying figure.

DETAILED DESCRIPTION OF CERTAIN PREFERRED EMBODIMENTS OF THE INVENTION

Figure 1:
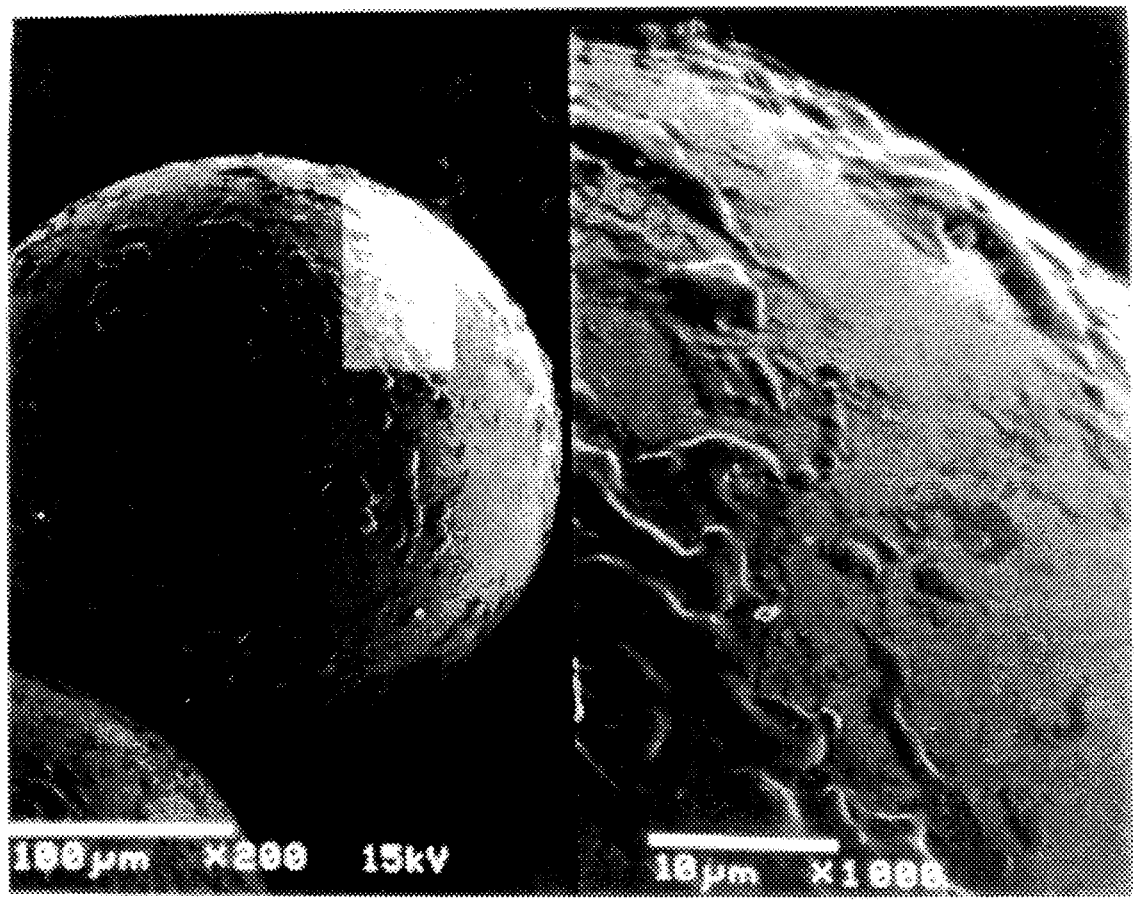
FIG. 1 depicts a scanning electron micrograph (hereinafter sometimes "SEM") of composite particles according to the invention.

It is a central feature of the present invention that the substance deposited on glass beads as aforesaid, though it may be a material that would otherwise easily be removed by an aqueous medium from the glass beads (for instance, because it is water-soluble in whole or in part), has the special property of adhering to the glass and therefore exhibits an enhanced durability, or resistance, to removal by an aqueous medium. This special property is typically conferred by the substance's incorporation of a functionality which enters into chemical bonding with a receptive functionality incorporated in the glass, such as a silanol functionality. It will be appreciated that enhanced durability, or resistance, to removal does not mean exclusively that the substance's actual water-solubility is decreased per se, as such decrease may not occur. Rather, it refers more broadly to the condition in which the utilization of a deposited substance as prescribed for the invention effects a decreased tendency toward its removal by the solubilizing and/or other action (e.g., mechanical or physical action) of the aqueous medium, whatever the mechanism (even if the substance's water solubility per se remains the same). In addition to any decrease in the water-solubility per se of the substance which may occur, this condition is a consequence of the aforementioned chemical bonding of the substance to the glass beads.

The deposited substance typically forms a film or coating on the glass beads, such that the substance is adhered to the glass beads while still leaving it functionally exposed to its environment so that interaction with one or more species of interest can occur. This is possible because, in accordance with the invention, none of the functionalities forming strong bonds with the glass materially affects the efficacy of the substance's one or more functionalities capable of interacting with a species of interest as aforesaid.

A suitable functionality for adhering the deposited substance to the bead is therefore any moiety or functional group which forms a stable hydrophobic bond with glass, but does not inhibit the functionality for interacting with a species of interest or otherwise interfere with attainment of the fundamental objectives of the invention. Preferably, the moiety or functional group is selected from the group consisting of isocyanate radicals, epoxy radicals, N-methylol, and silanol. However, other moieties or functional groups which fit the criteria set forth above can also be utilized.

Concurrently, a suitable functionality capable of interacting with a species of interest can be any moiety or functional group which has the desired interactive property, and does not inhibit the functionality for adhering the deposited substances to the glass or otherwise interfere with the attainment of the fundamental objectives of the invention. Typically, in certain preferred embodiments, this functionality is a moiety or functional group selected from the group consisting of sulfonate, sulfate and carboxylate. But, ultimately, the nature of this functionality is determined by the species of interest and the end-use application contemplated, and thus the functionality can vary over a wide range of moieties or groups to suit those species and end-use applications as long as the basic criteria set forth above are met.

The deposited substance typically covers the surface of a glass bead substantially continuously. Thus, when the deposited substance is, for example, a polyacrylic polymer (appropriately modified for adherence purposes to include functionality which bonds with glass), it preferably forms a continuous film on the bead. Most preferably, this would be a hard film to prevent its mechanical removal from the substrate. But, in other embodiments the deposit be discontinuous with the proviso that the substance covers the bead surface sufficiently to present the functionality capable of interacting with a species of interest in an amount which is effective for the intended purpose. By way of illustration, FIG. 1 is an SEM of composite particles according to the invention.

It is usually advantageous to utilize harder deposits (e.g., films) since they are more difficult than softer deposits to remove mechanically from the substrate. Apart from the simple benefit of enhanced durability, this results in a decrease (all other things being equal) in the amount of functionality (e.g., the required acrylic acid content) necessarily incorporated in the substance for interacting with a species of interest, to achieve the same long-term interactive capability. This is because the smaller the amount of substance removed due to the greater hardness of the deposit, the more functionality which remains on the bead in the long term. When the functionality is less easily dislodged from the bead, a lower functionality content can be used initially to achieve the same (or comparable) net or residual functionality content over the long term vis-a-vis a softer deposit (which is removed to a greater extent and hence must contain more functionality per unit volume initially).

The substance deposited on the glass beads can be any material which, in accordance with the invention, both provides one or more functionalities capable of interacting with the aforementioned species, and simultaneously incorporates a functionality causing it to exhibit a durability or resistance to removal from the glass bead by an aqueous medium, whatever the mechanism. This is the hallmark of multifunctionality in the context of the invention.

The deposited substance of this invention is typically a polymeric substance which is at least partially water-soluble or emulsifiable when not bound to a glass bead. By way of illustration, the introduction of a preferred functionality for interacting with a species of interest, such as anionic moieties (e.g., $COO^-$ and $SO_3^-$), increases the water solubility of polymer films. The incorporation of a functionality for adhering the substance to the glass beads remedies this, since—when bonded to glass by means of a functionality introduced to confer adherence—the deposited substance exhibits durability (or increased resistance) to removal of the substance from the composite by an aqueous medium.

While the category of suitable polymeric substances encompasses a plethora of materials within the broadly defined category, especially interesting types are polymeric materials (such as resins) having carboxylated side chains or sulfonated groups. The manufacture of such materials typically involves one or more of a variety of conventional processes including the preparation of a polymer (for instance, a cross-linked copolymer) by solution, suspension or emulsion polymerization or sulfonation of a double bond or ring.

The present invention can be practiced with pre-formed polymeric substances such as appropriately modified carboxylated polyacrylic acid (i.e., by applying an already formed polymer to the substrate), or alternatively by polymerizing a material or materials for forming the polymeric substance (such as acrylic acid, ethyl acrylate or methylmethacrylate, along with a component to introduce the required functionality conferring adherence to the glass such as N-methylol acrylamide) in situ on the substrate, optionally with a catalyst.

The deposited substance is preferably an acrylic ester polymer (containing appropriate functionality to effect adherence to the glass via a hydrophobic bond), such as an acrylic polymer with 10–30 weight % acrylic acid content (for example, NW-1715 available from Rohm & Haas, and having a latex content of 43–45% by weight and a glass transition temperature of −9° C.). This provides a coating exhibiting low tackiness and good abrasion resistance (the abrasion resistance of the latex coating is directly proportional to the stiffness of the polymer). The shorter the chain length of the alcohol used to make the ester of the acrylic ester polymer, the harder the coating obtained.

Acrylic ester polymers of the generic formula $$-\left[CH_2-CH \atop C(O)OR\right]_n$$

are suitable when appropriately modified insofar as necessary in accordance with the foregoing discussion. The nature of the "R" group determines the properties of each ester and the polymers it forms, with "n" being at least 20, and preferably at least 2000. Advantageously, R is $C_mH_{2m+1}$ wherein m is from 0 to 8. Acrylic monomers have been shown to be versatile building blocks. Hence, polymers designed to fit specific application requirements can be tailored from these versatile monomers.

As will be appreciated, the foregoing are examples of suitable materials having a high carboxyl functionality and a relatively low molecular weight, with an additional high level of functionality to accommodate bonding with the glass for adherence purposes.

The substance deposited on the glass beads in accordance with this invention can also be an emulsion or suspension polymer modified, if necessary, so as to incorporate both a functionality for adhering the substance to the aforementioned glass beads and a functionality for interacting with other species. For example, suitable substances include polyvinyl acetate, styrene butadiene, acrylonitrile butadiene styrene, polyvinyl chloride and copolymers thereof, appropriately modified as mentioned in the preceding sentence.

Some further examples of other suitable substances are SBR (styrene butadiene rubber) latex, acrylic VA (polyvinyl acetate/acrylic) copolymer, and PVC (polyvinyl chloride) latex, once again appropriately modified in accordance with the preceding paragraph. Generally, all of these examples have high molecular weights and are film formers. PVC polymers, however, will require an additional polymer or plasticizer to form film.

The deposited substance of this invention can also be a reactive silicone material further incorporating the requisite functionality capable of interacting with a species of interest. The reactive silicone should contain 1 to 12½% —SiOH by weight. In certain good embodiments of the invention, an alkoxy functional silicone (such as methoxy or ethoxy silicone) is utilized, with the alkoxy portion being capable of generating a glass-reactive moiety.

In other good embodiments a reactive silicone and a suitable polymeric material are utilized in combination, such that the deposited substance comprises a silicone resin combined with the polymeric material, to produce a copolymer. For its part, the polymerization reaction for forming the silicone resin proceeds as set forth below, with methanol liberated as a byproduct:

$$\equiv SiOCH_3 + H_2O \rightarrow \equiv SiOH + CH_3OH \quad (1)$$

$$\equiv SiOH \rightarrow \equiv SiOSi + H_2O \quad (2)$$

The resulting silicone resin is primarily silanol functional with some original methoxy functionality still preserved. As can be seen, a silanol species is reacted with another silanol species by cross-linking in the resin. When reactive silicone is used with another polymerizable material, such as thermosetting acrylics containing a methylolated polymer, condensation occurs during curing, i.e., heating.

The silanol moiety of the reactive silicone material attaches to the glass bead (or, for that matter, other inorganic material substrate containing a silanol function) through the reaction of $\equiv SiOH$ with the surface of the substrate itself, which also includes $\equiv SiOH$. The reaction is essentially:

$$R-SiOH + SiOH \rightarrow R-Si-O-Si+H_2O$$

For the purpose of this invention, it is preferable that the deposited substance is in the form of a non-tacky film, in order to produce free-flowing powder. This is one reason appropriately modified acrylic copolymers are a preferred substance; their tendency for self-cross-linking leads to non-tacky films. For example, the introduction of N-methylol acrylamide, which is a good cross-linker, produces a favorably non-tacky film that in turn reduces tackiness in the resulting product. Selection of appropriate acrylic ester components will also reduce tackiness.

While the invention is adaptable to utilization with all manner of inorganic material substrates having any suitable shape and size fitting the particular application, it is preferable to utilize a glass bead. The term "bead" as used herein refers to a small quantity of matter (for instance, a particle) which can be spherical, spheroidal or irregular (such as flake, multi-faceted object or the like) in shape. The glass bead can be fashioned of any suitable vitreous material, for example, A-glass (soda lime glass), C-glass (chemically resistant glass) and E-glass (borosilicate glass); pyrex is an acceptable material. The vitreous material constituting the bead incorporates one or more functionalities reactive with a functionality in the deposited substance to form a bond for adhering the substance to the bead. As mentioned previously, the reactive functionality incorporated is the glass in typically a silanol, but can in certain other embodiments be another suitable functionality incorporated in the glass, such as by doping or the like.

For the purpose of this invention, glass beads ranging in maximum dimension from 1 micron (μm) to 5 millimeters (mm) are preferred. More preferred are beads ranging from about 2 μm to 800 μm in maximum dimension. The most preferred bead sizes range from about 200 μm to 500 μm maximum dimension.

The deposited substance in present in an amount, relative to the amount of glass bead material, sufficient to effect the desired interaction with a species of interest (or other desired event or condition). The deposited substance contains an amount of the functionality effective to achieve this interaction, and also an amount of the glass-adherent functionality effective to confer a decreased tendency of the substance to removal by an aqueous medium. The composite of the invention (such as a composite particle) preferably contains the deposited substance, for example, in the form of a coating on the substrate, in an amount based on from 0.1–2.0%, especially 0.2–0.75%, wet pick-up on the weight of the glass bead. (By wet pick-up is meant the amount of the deposit on the bead, plus any water or other fluid vehicle accompanying same which is driven off during later processing; the term "on the weight of the glass" is hereinafter abbreviated as "owg".) However, those skilled in the art will appreciate that the relative amounts of glass bead and substance deposited thereon are empirically determined, and that in certain embodiments these amounts can be varied outside such preferred ranges to secure the benefits conferred by practice of the invention, without undue experimentation.

In the method for making a composite in accordance with the invention, a glass bead and the substance to be deposited on it are combined as follows: the substance to be deposited on the glass bead(s) (or one or more materials for forming same) is applied onto the glass bead(s) prior to curing. The composite thereafter is cured to impart the desired resistance to removal of the substance by an aqueous medium.

A thickener can be incorporated to reduce the amount of deposited substance (or materials for forming same) which are utilized. Ammonium hydroxide is frequently used, especially with suitable acrylic polymers, because thickening effects are reversible with ammonium hydroxide (and, in the case of such acrylic polymers, because the two are highly compatible). Other thickeners, such as cellulose gums, alginates and synthetic swelling agents can also be employed. The thickener enables the substance, or material(s) for forming same, to cling to the glass bead(s) more effectively, hence enabling the substance, or material(s) for forming same, to stay in place during processing. Moreover, the addition of a thickener ensures heavier and more uniform coverage when lower amounts of the substance, or material (s) for forming same, are used. One possible processing disadvantage of utilizing a thickener is that it tends to retard spreading of the substance or material(s) for forming same on the bead, and this should be taken into account when deciding whether to incorporate a thickening agent.

Additionally, when lesser amounts of such substance or material(s) for forming same are used, pre-wetting the glass bead(s) will aid in more uniform coating. Pre-wetting of the glass beads prior to application of the substance to be deposited (or material(s) for forming same) is preferable.

Pre-wetting can be performed using a surfactant. Typically, use of a surfactant is less important when the amount of deposited substance is greater, e.g., 0.5% owg, and more important as the amount of deposited substance decreases, e.g., at 0.25% owg. Various types of surfactants are suitable; the identification of which surfactant is useful for any particular set of materials and conditions is empirical, and capable of determination by those ordinarily skilled in the art without undue experimentation Typically, a surfactant can have the formula

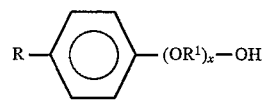

wherein R is hydrogen or $C_nH_{2n+1}$, $R^1$ is $C_nH_{2n}$, X is from 0 to 70, and n is from 1 to 20. Preferably, n is from 6 to 10. Specific examples are a substance available in commerce under the name Triton X-100, of the formula

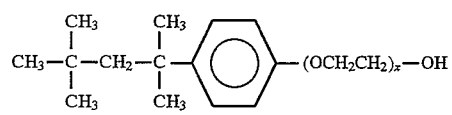

wherein x is 9–10, and a substance available in commerce under the name Triton N-401 (NPE-40), of the formula

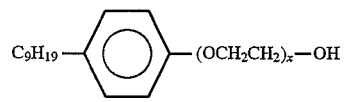

wherein x is 40.

The surfactant can be added to water which is the contacted with the bead prior to treatment with the the substance to be deposited thereon (or material(s) capable of forming such substance); because of the surfactant, the water penetrates more easily and spreads over the surface the glass bead(s). The bead is pre-wetted with water in an amount desired, preferably of from 0.025 to 0.75% owg, more preferably 0.05% owg. The preferred amount of surfactant is from 0.000005 to 0.00005% owg. However, it will be appreciated by those of ordinary skill in the art that the relative amounts of water and surfactant can vary outside such ranges in some embodiments, the determination of same being empirical in nature and within the competence of the ordinarily skilled worker (without undue experimentation).

Typically, the glass bead(s), as well as water and a surfactant (if utilized), are mixed together in a tumbler, rotary mixer, or the like (it is noted that other mixing apparatus which is capable of effectively admixing these components is also suitable); the substance to be deposited on the glass bead(s) (or material(s) capable of forming such substance) is then added as desired. The amount of glass beads and the amount of the substance (or material(s) capable of forming same) are sufficient to yield amounts of the various components of the composite which fall within the guidelines disclosed in preceding paragraphs.

The curing operation involves heating the composite of glass bead/deposited substance (or formative material(s)) at a temperature of at least 50° C. for a time sufficient to effect hardening of the deposited substance, such as 1–30 minutes. Preferably, the composite is heated at a temperature of from 60°–150° C., especially 120°–150° C., for 1–3 minutes. If required, additional cross-linking can be obtained by heating the coated dried particles at a temperature up to and including 150° C. for from 5 to 15 minutes. If desired, catalysts—for example, an appropriate Lewis acid—can be used to facilitate curing. Exposure of the materials to a temperature of at least 50° C. in connection with curing also has the highly beneficial result that the coating of each of the composite particles becomes dry and hard such that a multiplicity of the particles is free-flowing.

It is also advantageous in certain embodiments of the invention to subject the inorganic glass bead(s) and substance deposited thereon (or material(s) for forming such substance) to a pre-cure or drying step. This typically comprises heating to a temperature in the range from 50°–95° C. for a time from 2–30 minutes, prior to heating to a temperature of from 120°–150° C. for 2–30 minutes thereafter for the purpose of complete curing.

As a test to determine the extent to which the tendency of the deposited substance toward removal is decreased with the invention, a dye screening test can be employed, for instance, one using a polyacrylic acid indicator where appropriate (such as 1% Crystal Violet by weight in methanol) (hereinafter the "Crystal Violet test"). For glass beads coated with a polyacrylic acid substance, but not in accordance with the invention, washing after treatment with the indicator results in loss of the purple color since the indicator has not been attached to a persistent substance, but rather one that is removed by the aqueous medium. The preferred products, which are coated in accordance with the invention, typically retain the uniform purple color after washing with running water.

In a preferred aspect, the invention is a composite particle which comprises in combination a glass bead core, and a multifunctional polymeric substance deposited on said core, said substance having a functionality capable of interacting with a species of interest, and a further functionality interacted with a functionality of said glass bead core to adhere the substance to the glass, such that there is a decreased tendency of the substance toward removal from the composite particle by an aqueous medium.

Yet another preferred aspect of the invention is directed to a substantially free-flowing composition, which comprises a plurality of core glass beads and deposited on the core beads a multifunctional polymeric substance which has a functionality capable of interacting with a species of interest, and a further functionality interacted with a functionality of said core glass beads to adhere the substance to the glass, such that there is a decreased tendency of the substance toward removal from the composition by an aqueous medium.

In another preferred aspect, the invention is directed to a method of forming a durable composite particle, which comprises the steps of: treating a glass bead with a water-surfactant mixture; combining the treated bead (a) with a multifunctional polymeric substance which has a functionality capable of interacting with a species of interest, and a further functionality capable of interacting with said glass bead to adhere the substance to the glass, or (b) with one or more materials for forming such substance; and curing the substance or material or materials for forming same such that a non-tacky coating of said substance is formed and there is a decreased tendency of the substance toward removal from the composite particles by an aqueous medium.

Further objects of this invention, together with additional features contributing thereto and advantages accruing therefrom, will be apparent from the following examples of the invention (in the examples the term "substance" includes a material or materials for forming same).

EXAMPLE 1

65 pounds of P1040 glass beads (45–60 U.S. mesh) were charged into a clean stainless steel tumbler. The beads were tumbled while the temperature was raised to 50° C.

162.3 grams of acrylic latex polymer based substance (commercially available under the name Rhoplex NW-1715 from Rohm & Haas, Philadelphia, Pa.) were slowly added to the tumbler's contents over several minutes so that the substance was present in the amount of 0.55% owg.

Tumbling of the beads, after treatment as mentioned above, was continued for the purpose of curing until a temperature of about 120 ° C. was attained. The resultant beads were homogeneously coated with a smooth and even deposit of the aforementioned substance.

The resultant beads were surface wash tested. First, they were treated with Crystal Violet indicator. Then, cold water was passed by them at a water pressure of 1 gallon per minute. The beads were sampled at 2, 4, 6 and 8 hours to determine whether the violet-stain was being lost, as an indication of whether or not the deposited substance was being removed from the glass beads. It was found that at 2 hours the indicator was still quite substantially present; that after 4 hours only slightly less indicator was present; and that between 4 hours and 8 hours there was no appreciable change.

EXAMPLE 2

50 kg of glass beads (30–60 U.S. mesh) were tumbled while being heated and then treated with 275 g of Roplex NW-1715.

The beads, so treated, were subsequently tumbled while heating to a temperature of 70° C. to cure the substance deposited on the beads.

EXAMPLE 3

50 kg of glass beads (30–60 U.S. mesh) were treated with Rhoplex NW-1715 by the same procedure as described for Example 2.

The beads, so treated, were subsequently tumbled while heating to a temperature of 120° C. to cure the substance deposited on the beads.

It will be appreciated that variations and modifications to the products and methods of the invention can be made by the skilled person without departing from the spirit or scope of the invention as defined in the appended claims.

What is claimed is:

1. As an article of manufacture, a substantially free-flowing composite which consists essentially of, in combination:

a glass bead; and a multifunctional polymeric substance deposited on said glass bead, said substance having a first functionality capable of interacting with a species, wherein said first functionality is a moiety selected from the group consisting of sulfonate and carboxylate, and a second functionality interacted with said glass bead to form hydrophobic bonds which adhere the substance to the glass, wherein said second functionality is a moiety selected from the group consisting of epoxy radicals, N-methyol and silanol.

2. A composite as defined in claim 1, wherein the substance deposited on the glass bead forms a substantially continuous coating on the bead.

3. A composite as defined in claim 1, wherein the substance deposited on the glass bead is incorporated in an amount of from 0.1–2.0% owg, on a wet pick-up basis.

4. A composite as defined in claim 1, wherein the bead is of size from 1 μm to 5 mm in maximum dimension.

5. A composite as defined in claim 1, wherein said multifunctional polymeric substance is an acrylic latex polymer with 10–30 wt.% acrylic acid content.

6. A composite as defined in claim 5, wherein the acrylic is a material of the formula

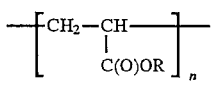

wherein n is at least 20 and R is $C_mH_{2m+1}$ and wherein m is from 0 to 8.

7. A substantially free-flowing composite particle which consists essentially of, in combination:

a glass bead; and a multifunctional polymeric substance which has a first functionality capable of interacting with a species, wherein said first functionality is a moiety selected from the group consisting of sulfonate and carboxylate, and a second functionality interacted with said glass bead to form hydrophobic bonds which adhere the substance to the glass, wherein said second functionality is a moiety selected from the group consisting of epoxy radicals, N-methyol and silanol.

8. A composite as defined in claim 7, wherein said multifunctional polymeric substance is an acrylic polymer with 10–30 wt.% acrylic acid content.

9. A multiplicity of durable composite particles, each of the particles consisting essentially of, in combination:

a glass bead core; and a multifunctional polymeric substance deposited on said core, said substance having a first functionality capable of interacting with a species, wherein said first functionality is a moiety selected from the group consisting of sulfonate and carboxylate, and a second functionality interacted with said glass bead core to form hydrophobic bonds which adhere the substance to the glass bead, wherein said second functionality is a moiety selected from the group consisting of epoxy radicals, N-methyol and silanol;

said multiplicity of particles being free-flowing.

10. A composite as defined in claim 9, wherein said multifunctional substance is an acrylic polymer with 10–30 wt.% acrylic acid content.

11. A substantially free-flowing composition, which consists essentially of plurality of core glass beads, and deposited on said core glass beads a multifunctional polymeric substance which has a first functionality capable of interacting with a species, wherein said first functionality is a moiety selected from the group consisting of sulfonate and carboxylate, and a second functionality interacted with said core glass beads to form hydrophobic bonds which adhere the substance to the glass beads, wherein said second functionality is a moiety selected from the group consisting of epoxy radicals, N-methyol and silanol.

* * * * *